United States Patent [19]

Iijima

[11] Patent Number: 4,839,792
[45] Date of Patent: Jun. 13, 1989

[54] PORTABLE ELECTRONIC APPARATUS WITH A DEVICE FOR DETERMINING DATA VALIDITY

[75] Inventor: Yasuo Iijima, Yokohama, Japan

[73] Assignee: Kabushiki Kaisha Toshiba, Kawasaki, Japan

[21] Appl. No.: 63,653

[22] Filed: Jun. 18, 1987

[30] Foreign Application Priority Data

Jun. 20, 1986 [JP] Japan ................. 61-144113
Jun. 20, 1986 [JP] Japan ................. 61-144114

[51] Int. Cl.$^4$ .............................................. G06F 1/00
[52] U.S. Cl. ................................. 364/200; 235/380
[58] Field of Search ............... 364/200, 900; 235/380

[56] References Cited

U.S. PATENT DOCUMENTS

| | | | |
|---|---|---|---|
| 3,971,916 | 7/1976 | Moreno | 364/200 |
| 4,090,247 | 5/1978 | Martin | 364/900 |
| 4,125,871 | 11/1978 | Martin | 364/900 |
| 4,575,621 | 3/1986 | Dreifus | 235/380 |

OTHER PUBLICATIONS

Dr. Hans-Joachim Sacht, "Daten-Disketten . Dateien" Vogel-Buchverlag Wurzburg, Feb. 11, 1985, pp. 55-58.

*Primary Examiner*—Raulfe B. Zache
*Attorney, Agent, or Firm*—Cushman, Darby & Cushman

[57] ABSTRACT

According to the portable electronic apparatus of the invention, when a data string is to be written in a data memory, information indicating whether the data string is valid or not is appended to the data string, and the data string is stored. When a read instruction is supplied from a portable electronic apparatus handling system, a CPU connected to the data memory appends the information, indicating validity or invalidity of the data string, to the start of the readout data string, and supplies the data string to the portable electronic apparatus handling system. When the data string supplied from the portable electronic apparatus handling system is to be written in the data memory, the CPU appends the information indicating invalidity to the data string and writes the data string, thereby updating the information indicating invalidity to information indicating validity after the completion of the data string writing.

9 Claims, 17 Drawing Sheets

| AREA NUMBER 20 | THE NUMBER OF BYTES 22 | START ADDRESS 24 | FINAL ADDRESS 26 |
|---|---|---|---|
| 01 | 5 | a a a | b b b |
| 02 | 4 | c c c | d d d |
| 03 | 4 | e e e | f f f |
| | | | |
| F E | 5 | g g g | h h h |
| F F | 3 | i i i | j j j |
F I G. 5
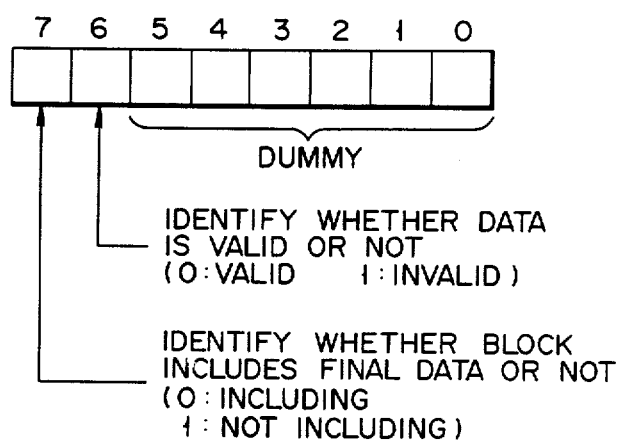
F I G. 6

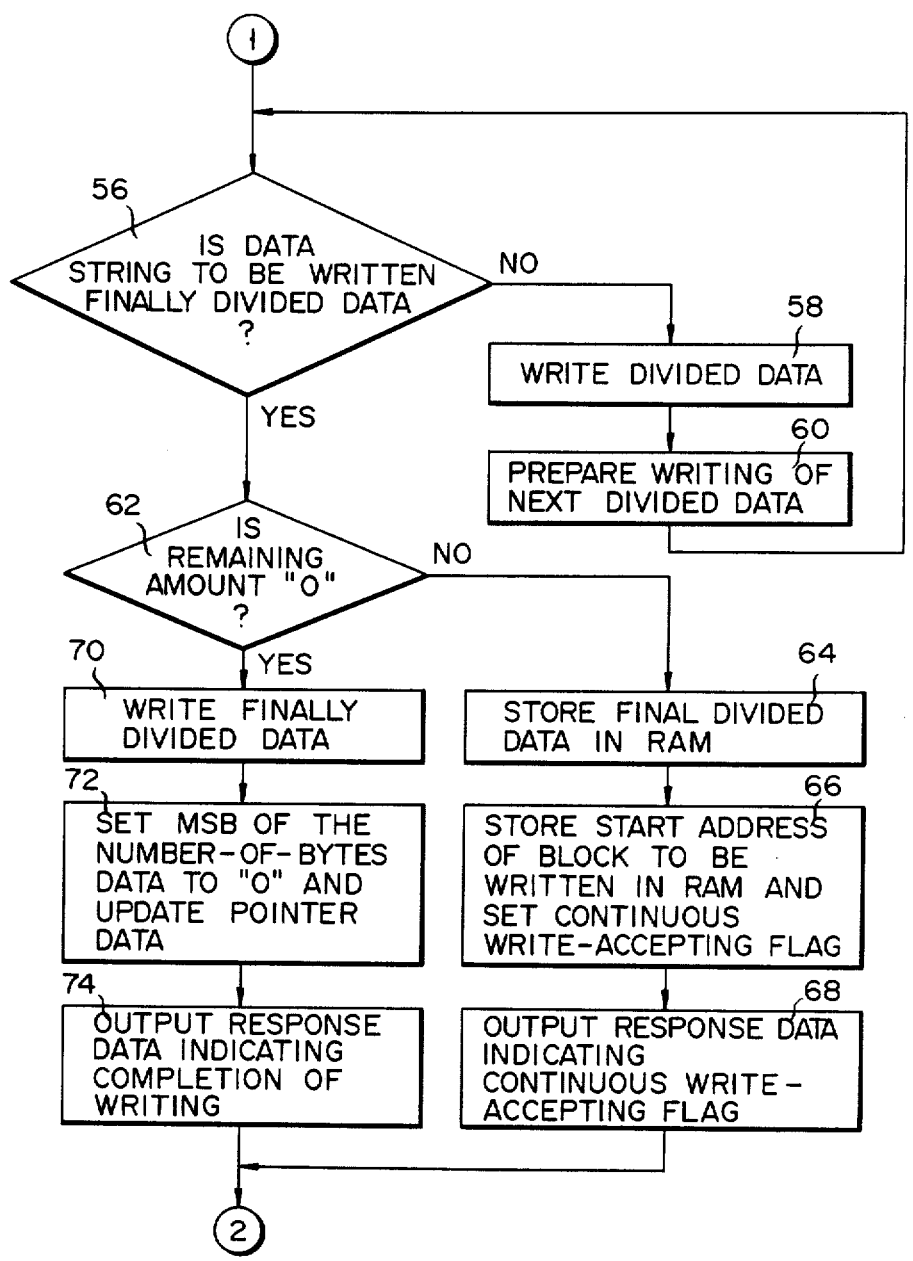
F I G. 7B

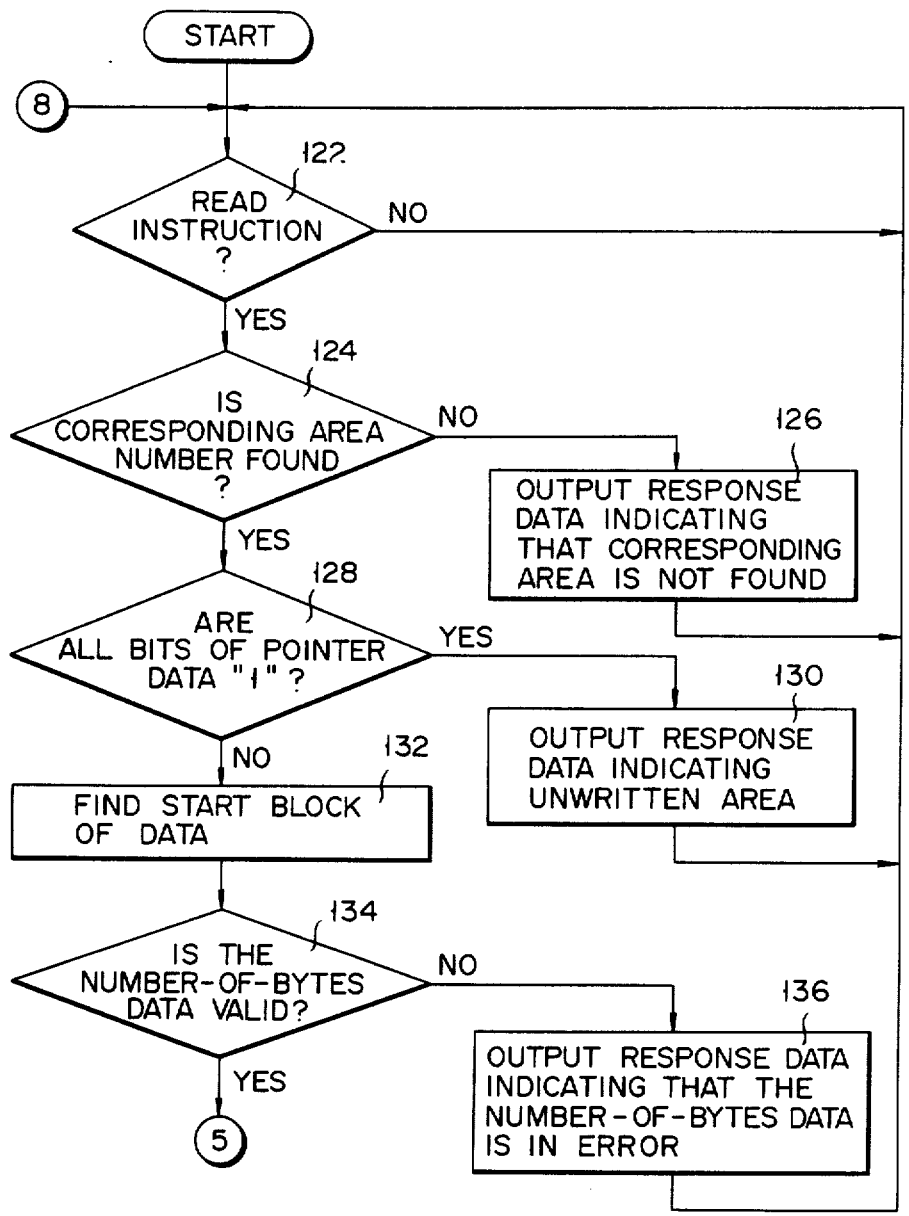
F I G. 12A

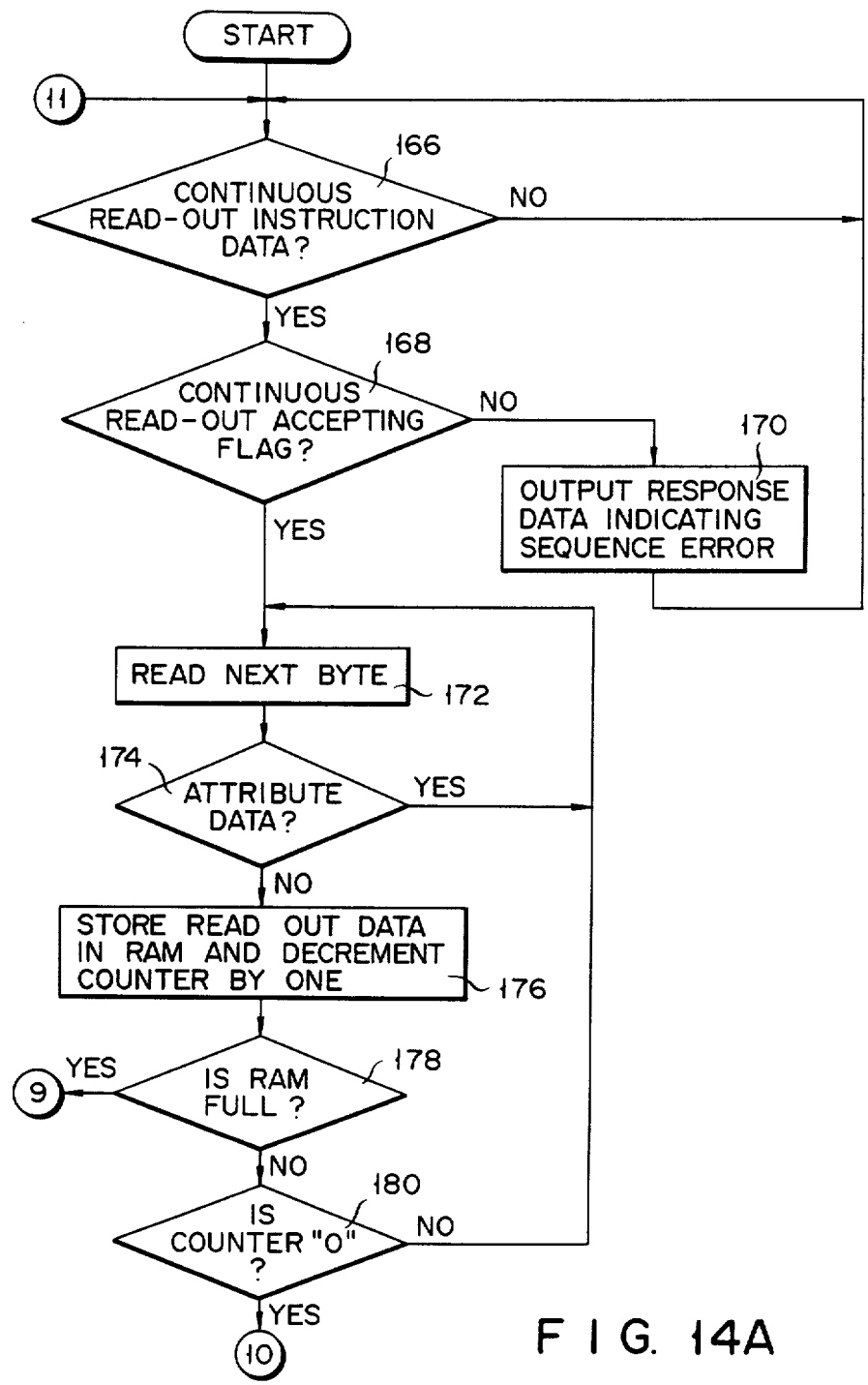
F I G. 14A

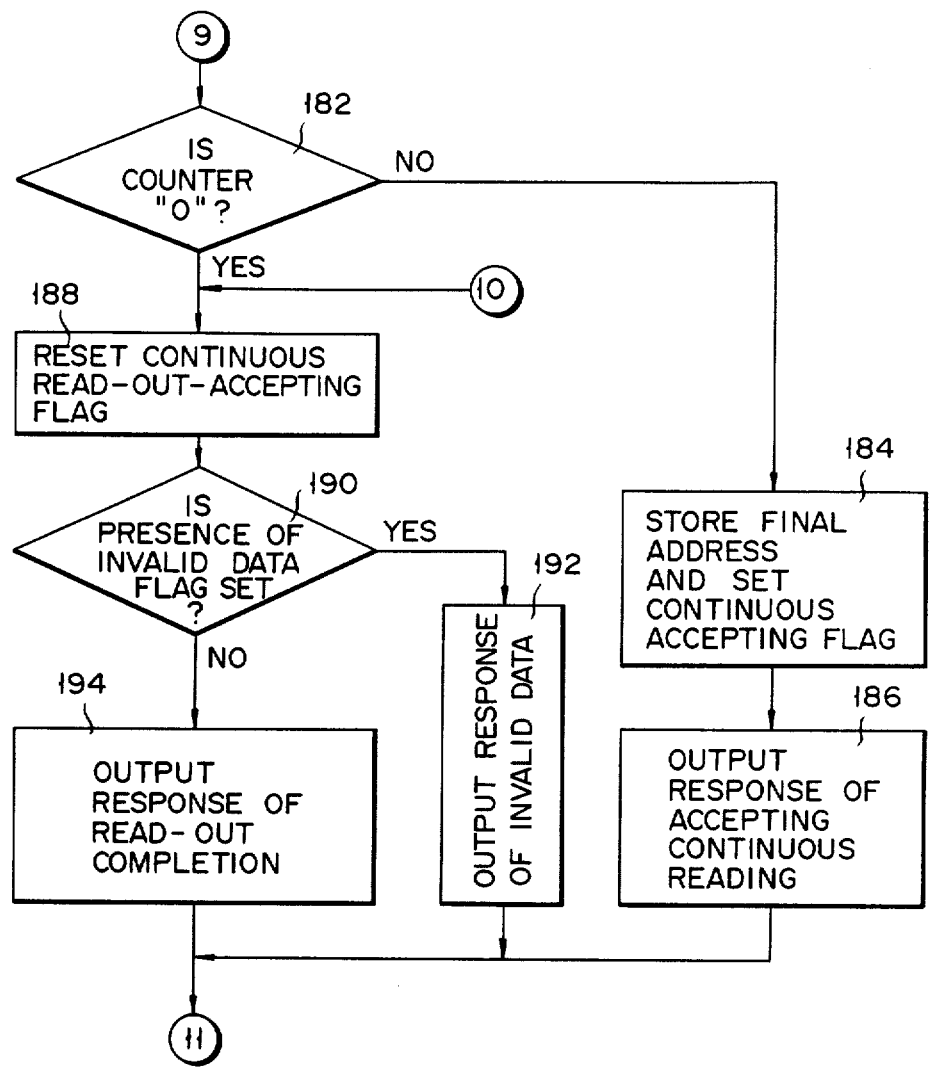
F I G. 14B
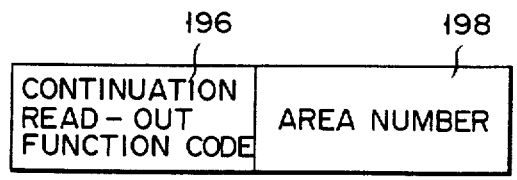
F I G. 15

FIG. 16A  AREA NUMBER / READ FUNCTION CODE

FIG. 16B  | 00 | 0B | A | B | C | D | E | F |

FIG. 16C  | 00 | 0B | A | B | C | D | E | F |  CODE INDICATING ACCEPTANCE OF CONTINUOUS READING

FIG. 16D  CONTINUATION READ FUNCTION CODE / AREA NUMBER

FIG. 16E  | G | H | I | J | K |

FIG. 16F  | G | H | I | J | K |  CODE INDICATING COMPLETION OF READ OUT

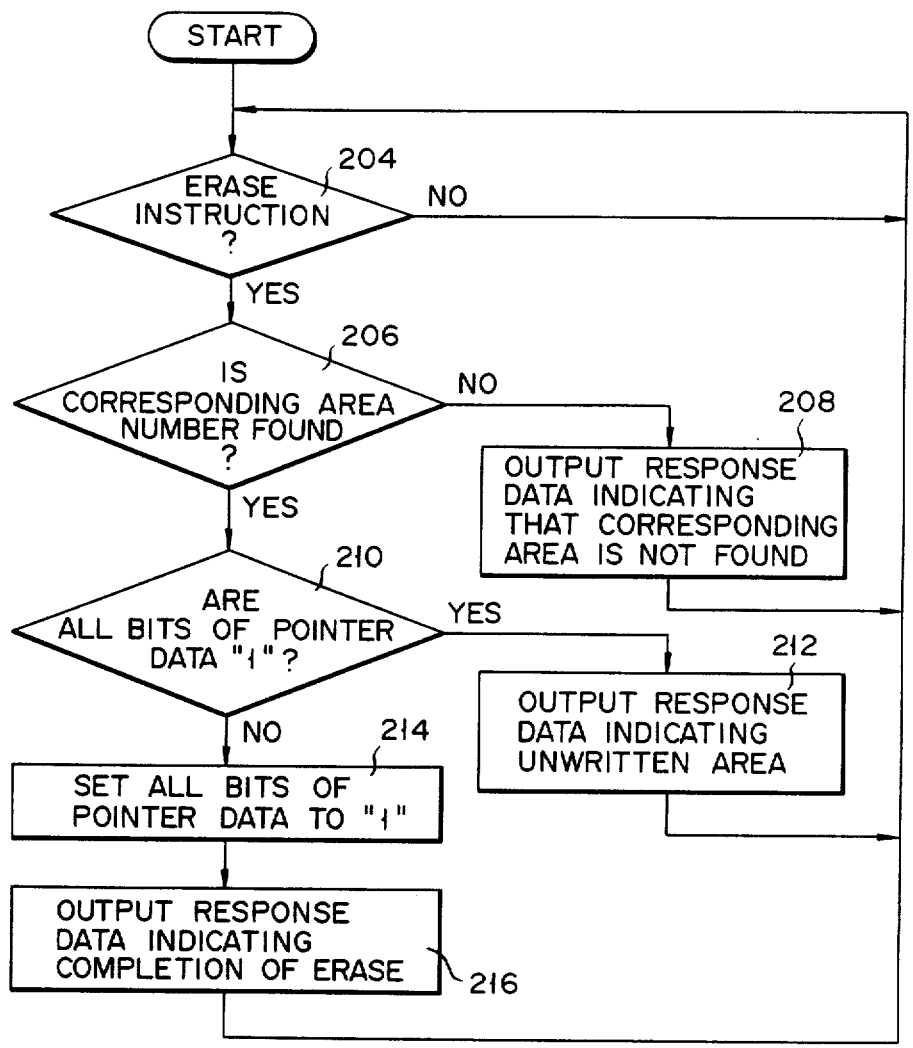
F I G. 17
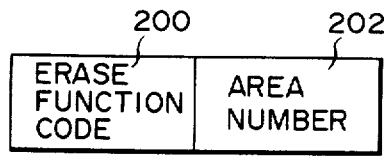
F I G. 18

4,839,792

PORTABLE ELECTRONIC APPARATUS WITH A DEVICE FOR DETERMINING DATA VALIDITY

BACKGROUND OF THE INVENTION

The present invention relates to a portable electronic apparatus which is called an IC card and incorporates an IC (integrated circuit) having, e.g., a nonvolatile data memory and a control element such as a CPU (central processing unit).

Recently, IC cards incorporating IC chips having nonvolatile data memories and control elements such as CPUs have begun to prevail as a new portable data storage medium. The data stored in the data memory incorporated in such an IC card is managed by an internal control element or an external unit.

As a method to access such an IC card, a random access is performed wherein the data memory is divided into a plurality of areas and the respective areas are accessed. In this case, specific data such as a start address of the target area and the number of bytes constituting the area is registered in the IC card. When the target area data is added to input instruction data, the specific data of the target area in the IC card is searched, converted into physical access data, and processed.

Generally, in order to increase the reliability of data stored in an IC card, when data is to be stored, specific information for identifying whether the data is valid or not is added to the data and the data is stored. If some abnormality occurs during data writing, this information is used in the subsequent data readout to determine that this data is abnormal. When the data is to be read out, whether the data is valid or not is determined in accordance with the specific information, and the determination result is added when the data is output to an external unit.

Conventionally, single response data is output in response to a single instruction data. When the response data is to be output, a code indicating the processing result in the IC card is added. The determination result regarding whether the data is valid or not, which is obtained upon the preceding data readout, is also converted into a code and output. However, when a data string has such a data length that the data string cannot be output by a single transmission, at a time of completion of data string output, the code is added to the data string and the data string is output.

In this manner, conventionally, when a data string having such a data length that the data string cannot be output by a single transmission is read out, a code indicating the validity of the data string is output only in the final transmission, and an external unit cannot determine the validity of the data until the final transmission.

When data is determined to be abnormal at the time it is written and when a write sequence for invalidating this data is set, for example, when a power source voltage supplied to an IC card is momentarily cut off, control of a control element is disabled, and data being written cannot be invalidated. As a result, reliability as an IC system is degraded.

SUMMARY OF THE INVENTION

It is an object of the present invention to provide a portable electronic apparatus wherein, when a data string having such a data length that the data string cannot be output by a single transmission is read out, the validity of the data string can be easily determined at the time of the first transmission.

It is another object of the present invention to provide a portable electronic apparatus wherein, even when a power source supply is momentarily cut off during data writing, the data can be reliably invalidated.

In order to achieve the above objects, the portable electronic apparatus according to the present invention comprises: a contactor section to be connected with a portable electronic apparatus handling system for generating a command for externally accessing the portable electronic apparatus; storage means for storing a data string supplied from the portable electronic apparatus handling system; and control means for out-putting a data string from the storage means after appending information indicating whether the data string is valid or not to the start of the readout data string in response to a read instruction supplied from the portable electronic apparatus handling system, and writing in the storage means a data string supplied from the portable electronic apparatus handling system after appending the information indicating invalidity of the data string to the data string, in response to a write instruction supplied from the portable electronic apparatus handling system, thereby updating the information indicating invalidity of the data string to valid information after the data string has been written.

BRIEF DESCRIPTION OF THE DRAWINGS

Other objects and features of the present invention will be apparent from the following description taken in connection with the accompanying drawings in which:

FIG. 5 is a view of the area "00" of the data memory shown in FIG. 3;

FIG. 6 shows the format of the attribute data stored in the hatched portions shown in FIG. 4;

FIGS. 7A and 7B are flow charts of the write operation for the data memory shown in FIG. 3;

FIGS. 12A through 12C are flow charts showing a read operation for the data memory shown in FIG. 3;

FIGS. 14A and 14B are flow charts of a continuous read operation for the data memory shown in FIG. 3;

FIG. 15 shows the format of a continuous read instruction used in the continuous read operation shown in FIGS. 14A and 14B;

FIG. 17 is a flow chart for explaining an erasure operation for the data memory shown in FIG. 3; and FIG. 18 shows the format of an erase instruction used in the erasure operation.

DETAILED DESCRIPTION OF THE PREFERRED EMBODIMENTS

Figure 1:
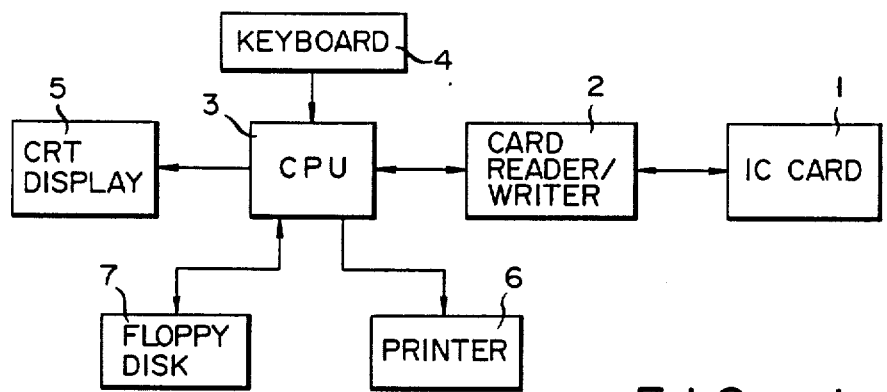
FIG. 1 is a block diagram showing the arrangement of a card handling unit used as a terminal unit of a home banking system or a shopping system which adopts an IC card as the portable electronic apparatus according to the present invention.
Figure 2:
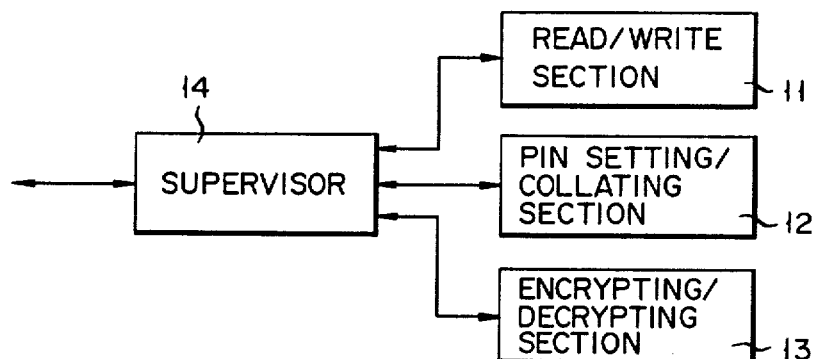
FIG. 2 is a block diagram of the IC card as the portable electronic apparatus according to the present invention.

An embodiment of the present invention will be described with reference to the accompanying drawings. FIG. 1 shows an arrangement of a card handling system used as a terminal unit of, e.g., a home banking system or a shopping system which adopts an IC card as a portable electronic apparatus according to the present invention. More specifically, in this card handling system, an IC 1 can be connected to central processing unit (CPU) 3 via card reader/writer 2, and CPU 3 is connected to keyboard 4, CRT display unit 5, printer 6, and floppy disk unit 7. IC card 1 is owned by a user and is used when a PIN (personal identification number) known only to the user is referred to or when necessary data is stored therein. FIG. 2 shows its function blocks.

Figure 3:
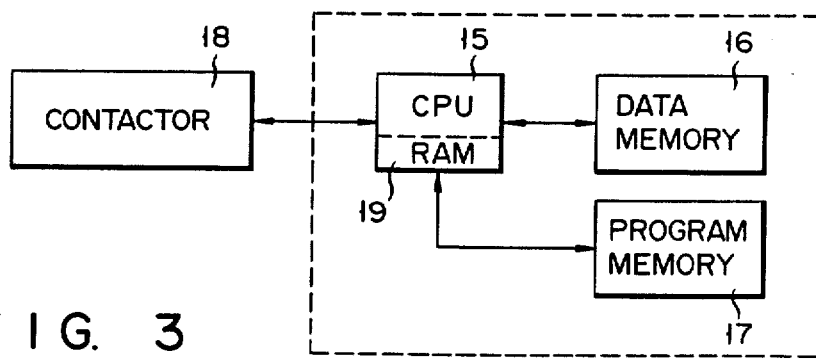
FIG. 3 is a block diagram showing the arrangement of an IC chip incorporated in the IC card shown in FIG. 2.

Referring to FIG. 2, card 1 comprises sections for executing basic functions such as read/write section 11, PIN setting/collating section 12, and encrypting/decrypting section 13, and supervisor 14 for managing these basic functions. Read/write section 11 reads, writes, or erases data with respect to data memory 16 (FIG. 3). PIN setting/collating section 12 stores the PIN set by the user, prohibits readout of the PIN, collates the PINs when a PIN is input, and gives permission for the following processing. Encrypting/decrypting section 13 encrypts communication data in order to prevent unauthorized observation or copying of the communication data when data is to be transmitted from CPU 3 to another terminal unit via, e.g., a communication network, and decrypts encrypted data. Encrypting/decrypting section 13 has a function to perform data processing in accordance with an encrypting algorithm, e.g., DES (Data Encryption Standard), which has a sufficient encryption capability. Supervisor 14 decrypts a function code input from reader/writer 2 or a function code appended to data, and selects and executes a necessary function among the basic functions.

In order to perform these various functions, IC card 1 consists of CPU 15 as the control section, nonvolatile data memory 16 as the data memory section whose memory content can be erased, program memory 17, and contact section 18 for obtaining an electrical contact with card reader/writer 2 as shown in, e.g., FIG. 3. Among these components, CPU 15 and memories 16 and 17, surrounded by a broken line, are constituted by a single IC chip. CPU 15 has random access memory (RAM) 19. Memory 17 comprises, e.g., a mask ROM and stores a control program for CPU 15 that has a subroutine for enabling the basic functions described above. Memory 16 is used for storing various data and comprises, e.g., an EEPROM.

Figure 4:
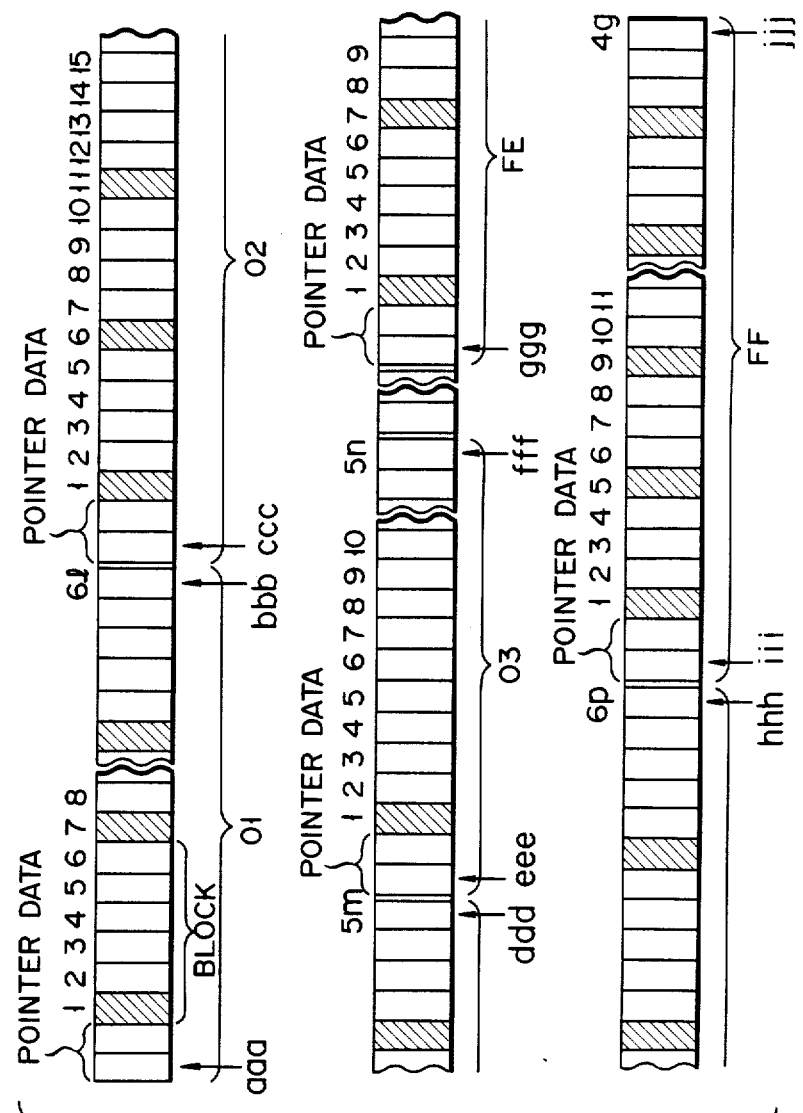
FIG. 4 is a detailed memory format of a data memory shown in FIG. 3.

Data memory 16 is divided into a plurality of areas as shown in FIG. 4. Each of these areas is divided into a single block or a plurality of blocks. Each block is constituted by a predetermined number of bytes. Processing is performed in units of blocks. One block consists of attribute data (1 byte) (hatched portion in FIG. 4) and storage data. Area numbers "00" to "FF" are assigned to corresponding areas, each divided as shown in FIG. 4. Among them, area "00" consists of area number field 20, the number of bytes field 22, start address field 24 indicating a start address of each area, and final address field 26 indicating a final address of each area, as shown in FIG. 5. The start address of area "01" is address aaa and the final address thereof is address bbb. One block consists of 6 bytes. The number of bytes of storage data is 5 bytes per block. An area is provided in the start of each area in order to store an address (to be referred to as pointer data hereinafter) of a final byte of a final block when the final block is written upon data writing. Attribute data includes an identifier indicating whether the corresponding storage data is valid or not, and another identifier indicating whether the corresponding block is a block storing the final data when a string of storage data consists of a plurality of blocks.

FIG. 6 shows the format of the attribute data. As shown in FIG. 6, the 6th bit is an identifier indicating whether the storage data in the corresponding block is valid or not. If this bit is "1", the storage data is invalid; if "0", the storage data is valid. The 7th bit is an identifier indicating whether the corresponding block is a block including a final byte of a string of data. If this bit is "1", the corresponding block is a block not including the final byte; if "0", the corresponding block is a block including the final byte. The zero to 5th bits are dummy bits.

Figure 7A:
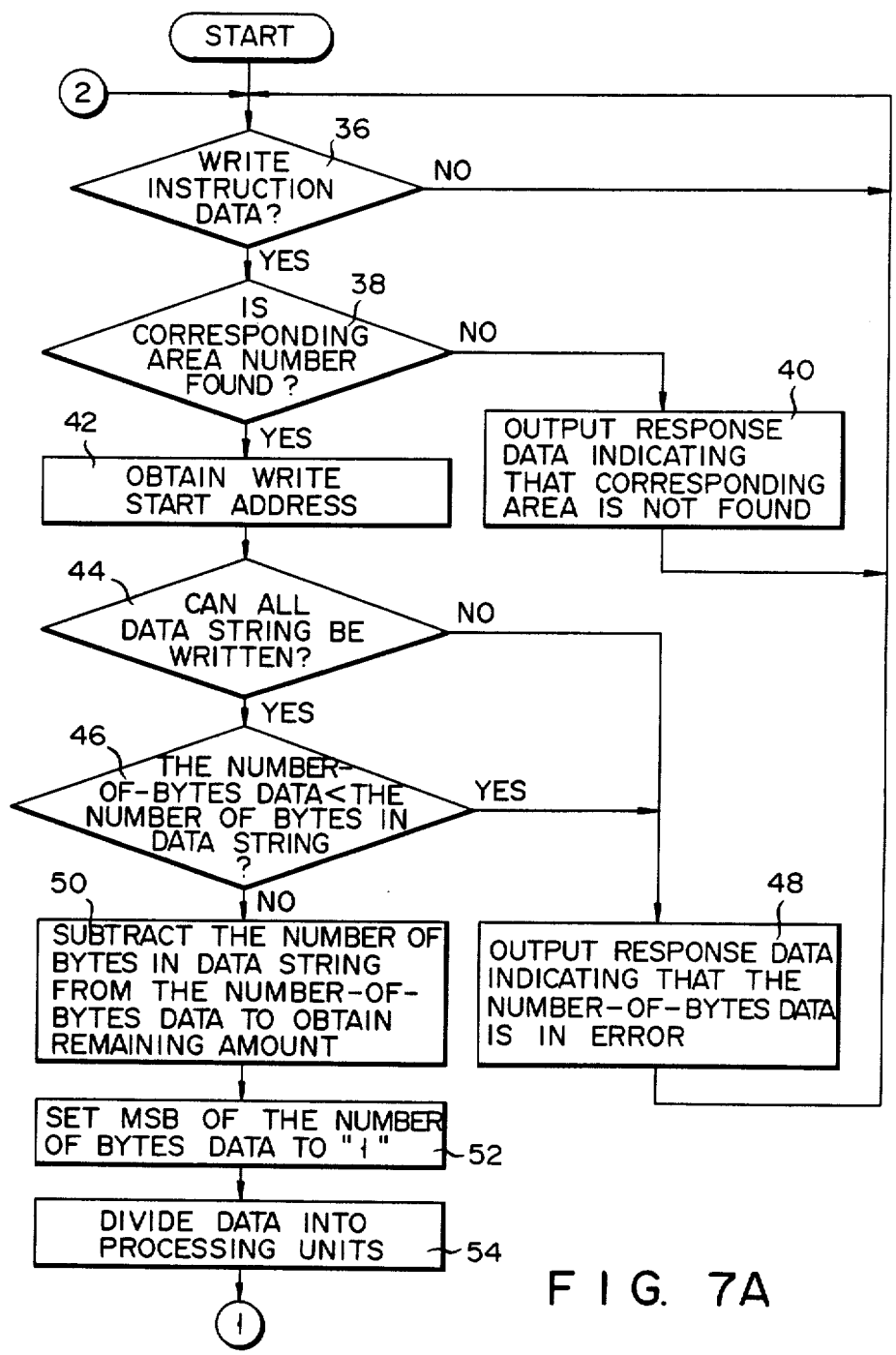

A data write operation for data memory 16 of IC card 1 with the above arrangement will be described with reference to the flow charts shown in FIGS. 7A and 7B.

Figure 8:
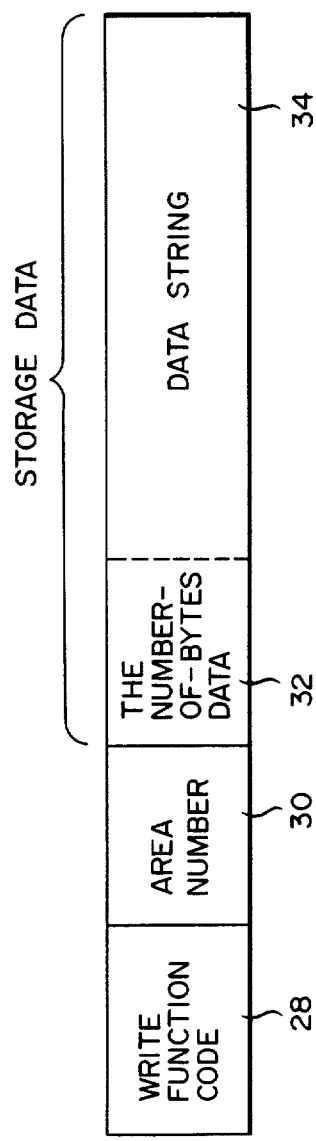
FIG. 8 shows the format of the write instruction used in the write operation shown in FIGS. 7A and 7B.

Data writing to data memory 16 of IC card 1 is performed when instruction data having a format as shown in FIG. 8 is supplied to card 1 via card reader/writer 2 from CPU 3, shown in FIG. 1, and when CPU 15 executes the instruction. The writing instruction consists of write function code field 28, area number field 30, the number of bytes data field 32, and data string field 34. Storage data consists of a data string to be stored, and the number of bytes data (to be referred to as the number of bytes in the data string hereinafter) constituting the data string. In a normal state, an instruction wait mode for card reader/writer 2 is set. In this case, when instruction data is input from reader/writer 2, CPU 15 checks in step 36 whether the function code included in the instruction data is for writing or not. If YES in step 36, CPU 15 finds in step 38 an area number appended to the instruction data from area "00" of data memory 16. If the corresponding area number is not found (NO in step 38), CPU 15 outputs in step 40 response data indicating that a corresponding area is not found by card reader/writer 2, and the flow returns to an instruction data wait mode for waiting for instruction data from reader/writer 2. If YES in step 38, CPU 15 refers to the corresponding processing unit data. When storage data is to be written in an area, CPU 15 refers to the pointer data located at the start of the area in step 42 and checks the start address. Subsequently, in step 44, CPU 15 compares the number of bytes data in the instruction data and the capacity (the number of bytes) of each area shown in FIG. 5 in order to determine whether all the input storage data can be stored in the area. If NO in step 44, CPU 15 outputs response data indicating that the number of bytes data is in error to reader/writer 2, in step 48, and the flow returns to the instruction data wait mode for reader/writer 2. If YES in step 44, CPU 15 compares the number of bytes in the data string with the number of bytes data included in the input instruction data, in step 46. As the result of this checking, if the former is larger than the latter (if YES in step 46), CPU 15 outputs response data indicating that the number of bytes data is in error to reader/writer 2, in step 48, and the flow returns to the instruction data wait mode. Otherwise (if NO in step 46), the number of bytes in the data string is subtracted from the number of bytes data to obtain the result as the remaining amount, in step 50.

In step 52, CPU 15 of card 1 sets the MSB (Most Significant Bit) (field 32 of FIG. 8) of the bit string constituting the number of bytes data shown in FIG. 8 to "1", thereby temporarily invalidating the storage data. Subsequently, in step 54, CPU 15 divides the storage data into processing units, appends attribute data to each of the divided data, and stores them. More specifically, in step 56, CPU 15 checks if the data string to be written is the final divided data. If NO in step 56, the divided data is written in data memory 16 in step 58, and the next divided data to be written is prepared in step 60.

If YES in step 56, it is checked in step 62 whether the remaining amount is "0". In this case, if the remaining amount held in advance is "0" (YES in step 62), the final divided data is written in step 70, and the MSB of the bit string constituting the number of bytes data shown in FIG. 8 is set to "0" in step 72. Thus, the storage data is validated and the final address of the block including the final byte of the storage data string is stored as pointer data. In step 74, CPU 15 outputs response data indicating completion of writing, and the flow returns to the instruction data wait mode. However, if NO in step 62, CPU 15 does not store only the final divided data, but holds it in an internal RAM, in step 64. Subsequently, in step 66, CPU 15 sets the continuous write-accepting flag and holds the start address of the next unwritten block in the RAM as a write start address. In step 68, CPU 15 outputs response data indicating continuous write-acceptance, and the flow returns to the instruction data wait mode.

Figure 10:
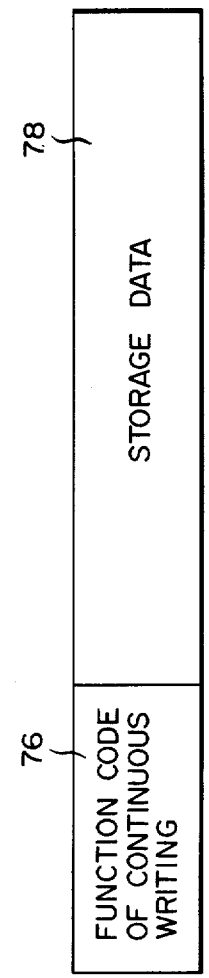
FIG. 10 shows the format of a continuous write instruction used in the continuous write operation shown in FIGS. 9A and 9B.
Figure 9A:
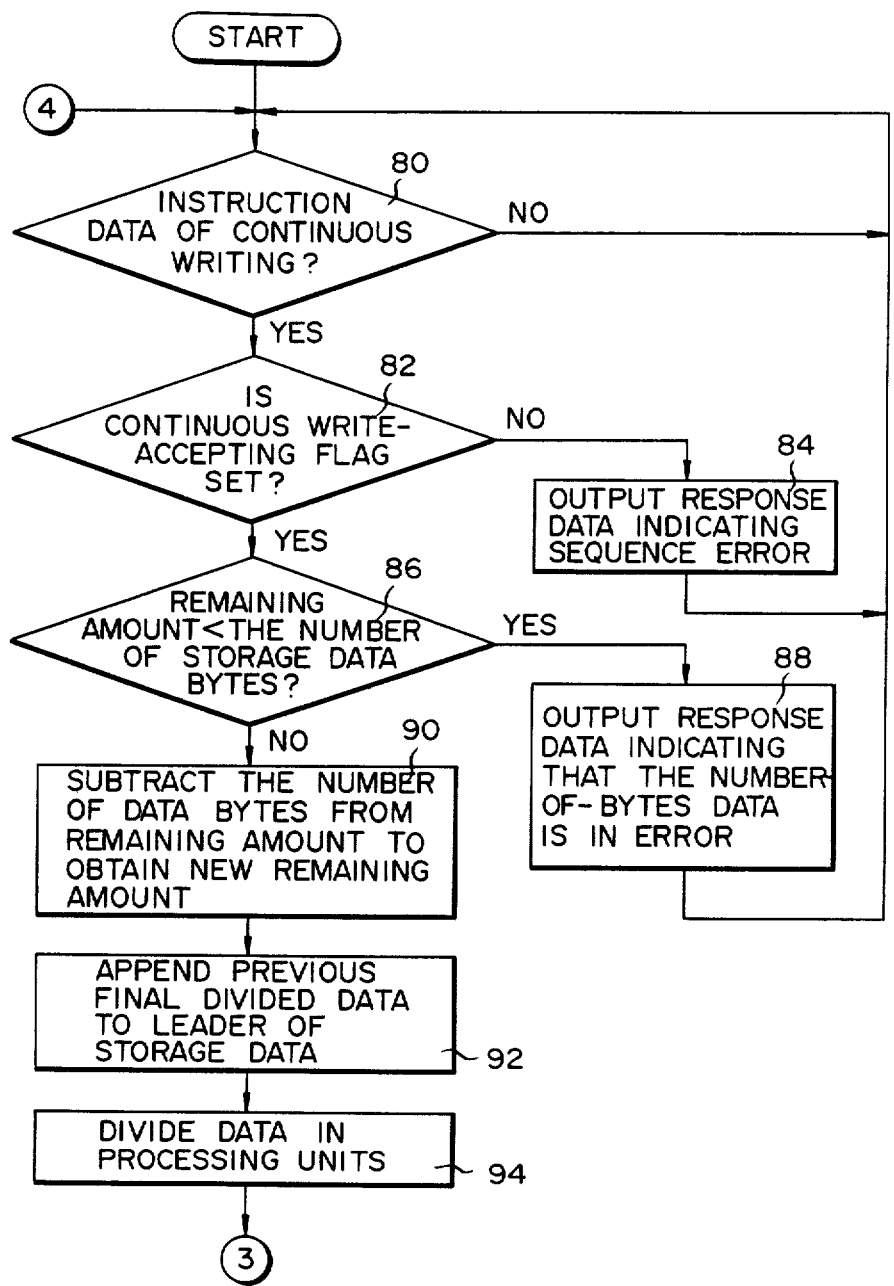
FIGS. 9A and 9B are flow charts of the continuous write operation for the data memory shown in FIG. 3.
Figure 9B:
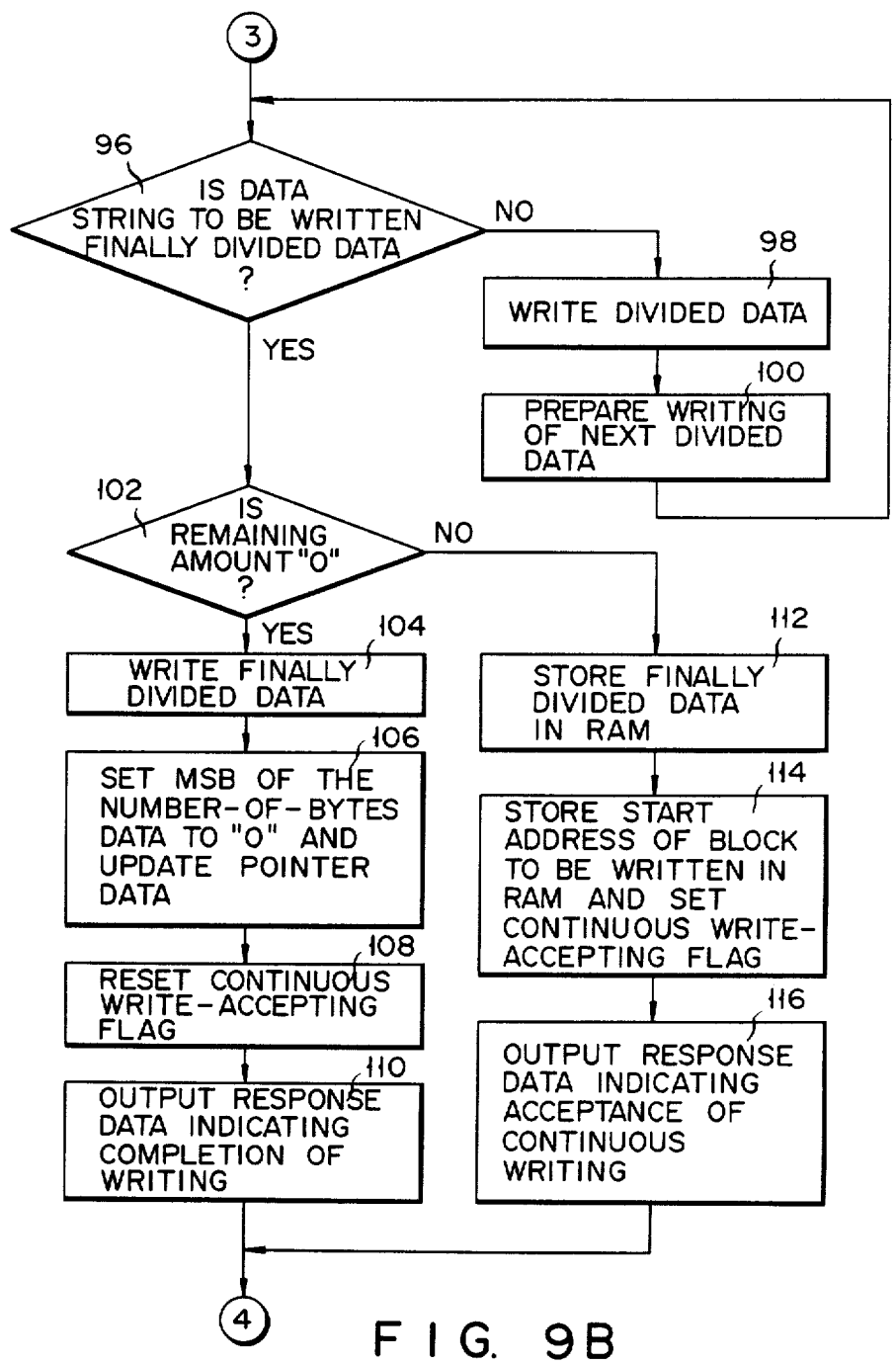

A continuous write operation will be described with reference to the flow charts shown in FIGS. 9A and 9B. When continuous writing is performed, continuous writing instruction data having a format as shown in FIG. 10 is input. The continuous writing instruction data consists of continuous writing function code field 76 and storage data field 78. When it is determined in step 80 that continuous writing instruction data is input (if YES in step 80), CPU 15 refers to the continuous write-accepting flag and checks if the flag is set, in step 82. If NO in step 82, CPU 15 outputs response data indicating a sequence error to card reader/writer 2 in step 84, and the flow returns to the instruction data wait mode.

If YES in step 82, CPU 15 checks the number of bytes of the input storage data and the remaining amount, in step 86. As the result of the checking in step 82, if the former is larger than the latter (YES in step 86), CPU 15 outputs response data indicating that the number of bytes data is in error, in step 88, and the flow returns to the instruction data wait mode. Otherwise, (if NO in step 86), CPU 15 subtracts the former from the latter and holds the subtraction result as a new remaining amount, in step 90.

Subsequently, in step 92, CPU 15 generates new storage data by appending previous final divided data, held in advance in the RAM, to the leader of the input storage data. In step 94, CPU 15 divides the new storage data in processing unit data and appends attribute data to the respective divided data. Then, CPU 15 stores data based on the write start address held in the RAM in advance. More specifically, CPU 15 divides data in processing units in step 94, and checks in step 96 if the data string to be written is the final divided data. If NO in step 96, the divided data is written in step 98, preparation for writing the next divided data is performed in step 100, and the flow returns to step 96.

If YES in step 96, it is checked in step 102 whether the remaining amount is "0". If YES in step 102, the final divided data is written in step 104, the MSB of the number of bytes data is set to "0" in step 106, and the pointer data is updated. Subsequently, CPU 15 resets the continuous write-accepting flag in step 108, and outputs response data indicating completion of writing in step 110.

If NO in step 102, the final divided data is stored in the RAM in step 112. In step 114, the start address of the block to be written next is stored, and the continuous write-accepting flag is set. In step 116, CPU 15 outputs response data indicating acceptance of continuous writing, and the flow returns to the instruction data wait mode. In this manner, a data string which cannot be written by a single transmission is stored. In a block for storing final divided data in a case when the remaining amount is "0", the 7th and 6th bits are both set to "0".

Figure 11A:
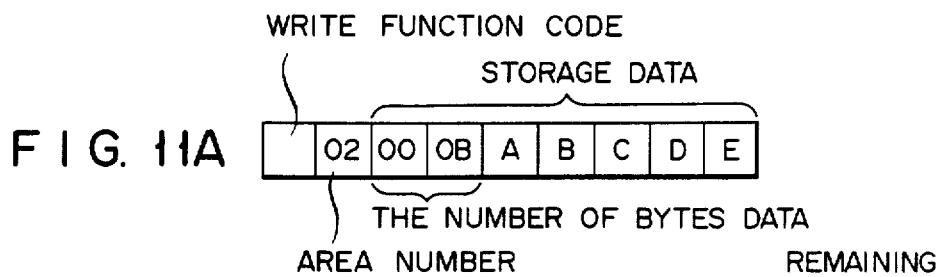
FIGS. 11A through 11J are diagrams for explaining a practical writing operation shown in the flow charts of FIGS. 7A and 7B.
Figure 11B:
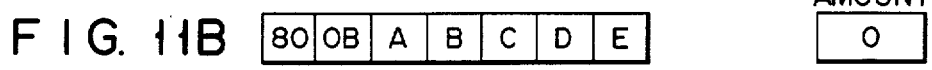
Figure 11C:
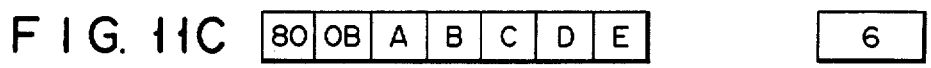
Figure 11D:
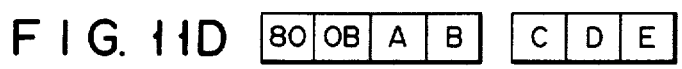
Figure 11E:
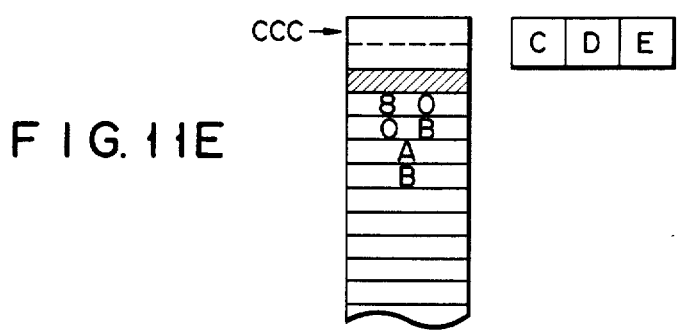

For example, assume that instruction data as shown in FIG. 11A is input. This corresponds to write instruction data and its target area is "02". The number of processing unit bytes of area "02" is 4. First, the number of bytes data in the input instruction data is extracted. Simultaneously, the pointer data located at the start of area "02" is referred to check that all the storage data can be stored. Then, the MSB of the number of bytes data is set to "1" (FIG. 11B). Subsequently, the remaining amount is set from the number of bytes of the storage data and the value of the number of bytes data (FIG. 11C). The storage data is divided by the number of processing unit bytes (FIG. 11D) and stored in area "02", as shown in FIG. 11E. However, since the remaining amount is other than "0", the final divided data is not stored. Then, an address to be written next is held, and the continuous write-accepting flag is set.

Figure 11F:
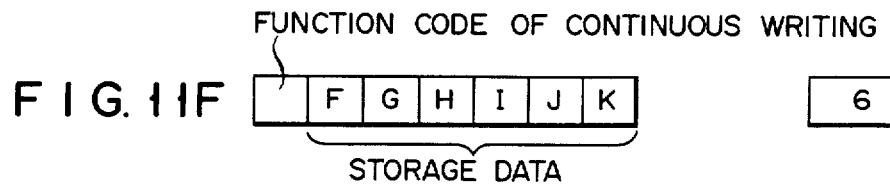
Figure 11G:
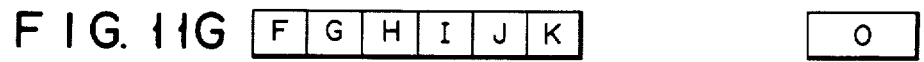
Figure 11H:
Figure 11I:
Figure 11J:
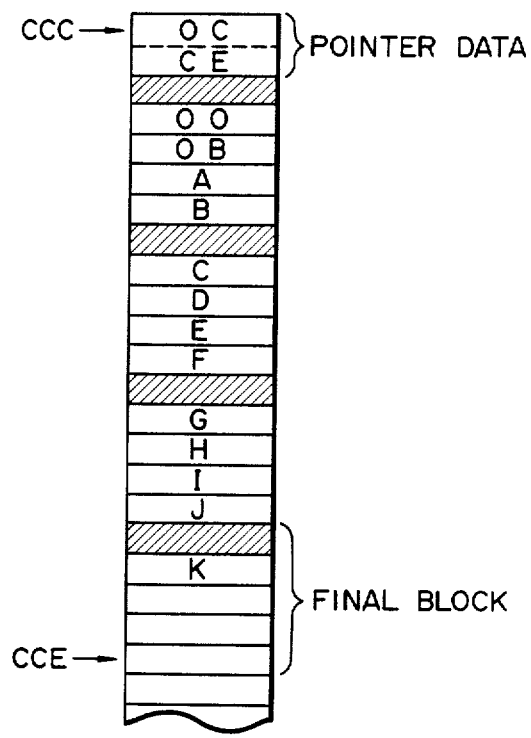

In this state, assume that the continuous write instruction data as shown in FIG. 11F is input. Then, the number of bytes of storage data in this instruction data is checked. If the checked result is acceptable, a new remaining amount is set from the previous setting amount and the number of bytes of the current storage data (FIG. 11G). The previously held final divided data and the current storage data are combined (FIG. 11H). The resultant storage data is divided by the number of processing unit bytes (FIG. 11I) and stored in accordance with the previously stored write address (FIG. 11J). In this case, since the remaining amount is "0", the MSB of the number of bytes data is set to "0", and the final address is stored as the pointer data.

Figure 12B:
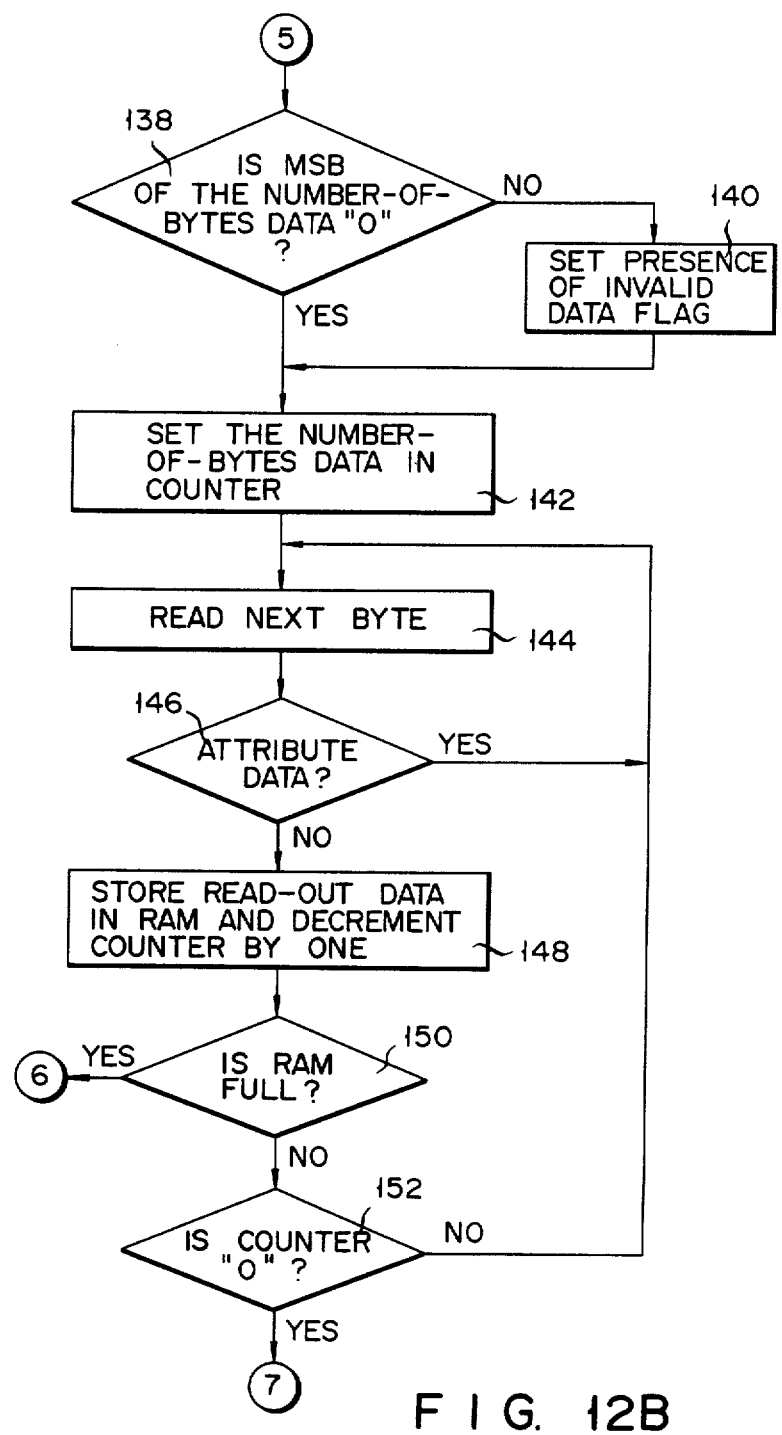
Figure 12C:
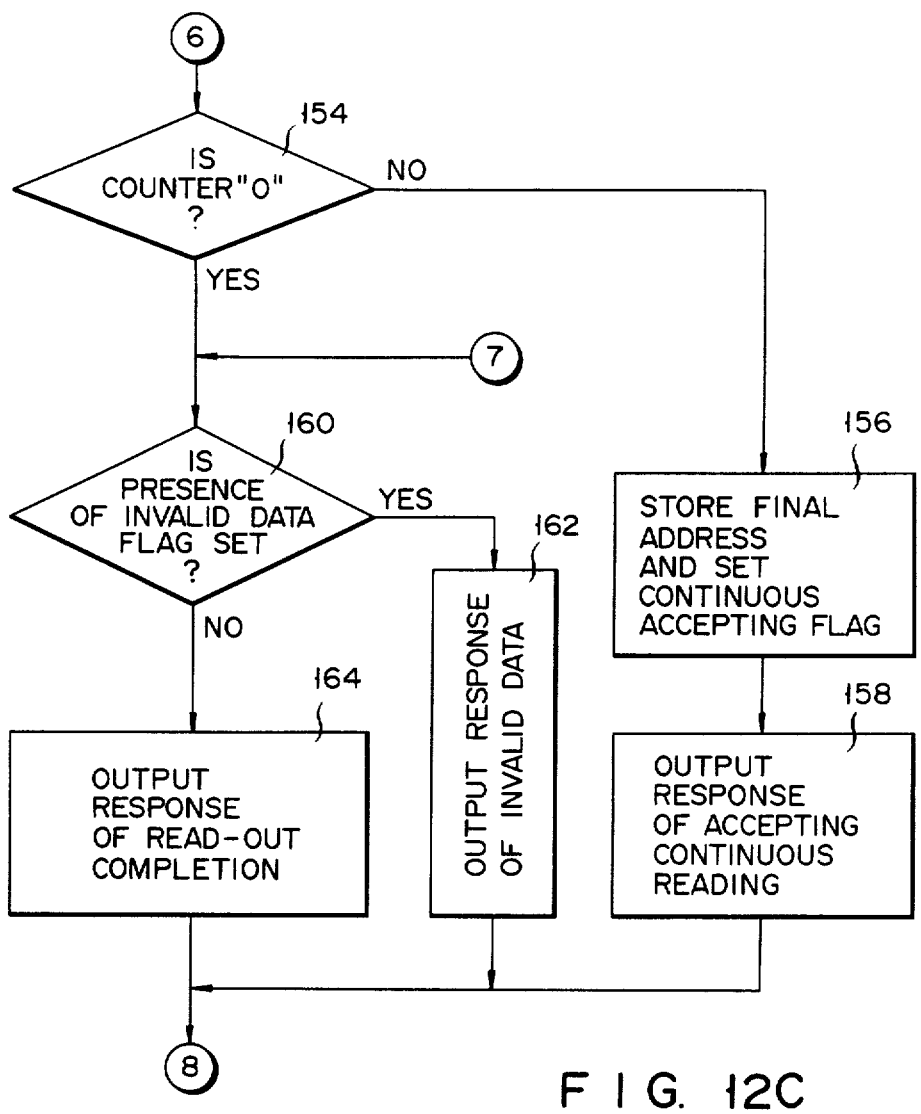
Figure 13:
FIG. 13 shows the format of a read-out instruction used in the read operation shown in FIGS. 12A through 12C.

A data read operation for data memory 16 will be described with reference to the flow charts shown in FIGS. 12A through 12C. When data stored in data memory 16 is to be read out, read instruction data having a data format as shown in FIG. 13 is input. This read instruction data consists of read function code 118 and area number 120. In a normal state, an instruction data wait mode to wait for an instruction from card reader/- writer 2 is set. In this case, when instruction data is input from reader/writer 2, CPU 15 checks in step 122 whether the function code included in the instruction data is for reading. If YES in step 122, CPU 15 finds an area number appended to the instruction data from area "00" of data memory 16, in step 124. If the corresponding area number is not found (NO in step 124), CPU 15 outputs response data indicating that the corresponding area is not found in step 126, and the flow returns to the instruction data wait mode of step 122. If the corresponding area number is found (YES in step 124), CPU 15 refers to the corresponding processing unit data, and stores it in the RAM that stores the start and final addresses of that area. When data in this area is to be read out, in step 128, CPU 15 refers to pointer data located at the start of the area. If it is determined in step 128 that all the bits of this pointer data are "1" (YES in step 128), CPU 15 determines that no data is stored in this area and outputs in step 130 response data indicating the area to be unwritten, and the flow returns to the instruction data wait mode of step 122. However, if it is determined in step 128 that not all the bits of the pointer data are "1" (NO in step 128), CPU 15 recognizes the start block of the most recent data in this area based on this pointer data in step 132. The number of bytes data is stored in this start block. Subsequently, CPU 15 checks if the number of bytes data is valid, in step 134. If NO in step 134, CPU 15 outputs response data indicating that the number of bytes data is in error in step 136. However, if YES in step 134, CPU 15 checks in step 138 if the MSB of the number of bytes data is "0". If NO in step 138 (if the MSB of the number of bytes data is "1"), CPU 15 determines that a data string following this MSB is invalid, and sets the presence of invalid data flag in step 140. However, if YES in step 138, CPU 15 sets the number of bytes data in the counter in step 142. Subsequently, CPU 15 reads out the next single byte in step 144, and checks in step 146 whether the readout byte is attribute data. If YES in step 146, the flow returns to step 144 and the next byte is read out. If NO in step 144, the readout data is stored in the RAM and the content of the counter is decremented by one, in step 148. In step 150, it is checked whether the RAM is full. If NO in step 150, it is checked in step 152 whether the counter is "0". If NO in step 152, the flow returns to step 144, and the next byte is read out.

However, if YES in step 150, the flow advances to step 154 and it is checked whether the counter is "0". If NO in step 154, CPU 15 stores a readout final address in the RAM and sets a continuous read-accepting flag, in step 156. Then, in step 158, CPU 15 outputs response data which indicates acceptance of continuous reading and is appended with the data string in the RAM, and the flow returns to step 122.

However, if YES in step 154, CPU 15 checks in step 160 whether the presence of invalid data flag is set. If YES in step 160, CPU 15 outputs response data which indicates invalid data and is appended with the data string in the RAM, in step 162, and the flow returns to step 122. However, if NO in step 160, CPU 15 outputs response data which indicates read-out completion and is appended with the data string of the RAM, in step 164, and the flow returns to step 122.

A continuous read-out operation will be described with reference to the flow charts of FIGS. 14A and 14B. When continuous read-out is performed, continuous read instruction data having a format as shown in FIG. 15 is input. The continuous read-out instruction data consists of continuation read-out function code field 196 and area number field 198. When it is determined in step 166 that a continuous read-out instruction is input, CPU 15 checks in step 168 whether a continuous read-out accepting flag is set. If NO in step 168, CPU 15 outputs response data indicating a sequence error in step 170, and the flow returns to step 166 to wait for continuous read-out instruction data. If YES in step 168, the next byte data is read out in step 172. Subsequently, CPU 15 checks in step 174 whether the readout byte data is attribute data. If YES in step 174, the flow returns to step 172 and the next byte data is read. However, if NO in step 174, CPU 15 stores the readout data in the RAM and decrements the counter by one, in step 176. In step 178, CPU 15 checks whether the RAM is full. If NO in step 178, CPU 15 checks in step 180 whether the counter is "0". If NO in step 180, the flow returns to step 172 and the next byte data is read. If YES in step 180, the flow of CPU 15 advances to step 188.

In step 178, if the RAM is full (if YES in step 178), the flow of CPU 15 advances to step 182 and checks whether the content of the counter is "0". If NO in step 182, the flow advances to step 184 to store the readout final address in the RAM. Then, in step 186, CPU 15 outputs response data which indicates acceptance of continuous reading and is appended with the data string of the RAM, and the flow returns to step 166.

If YES in step 182, CPU 15 resets the continuous read-out-accepting flag in step 188, and it is checked in step 190 whether the presence of invalid data flag is set. If YES in step 190, in step 192, CPU 15 outputs response data which indicates invalid data and is appended with the data string in the RAM, and the flow returns to step 166. However, if NO in step 190, CPU 15 outputs response data which indicates read-out completion and is appended with the data string of the RAM, in step 194, and the flow returns to step 166.

Figure 16:
FIGS. 16A through 16F are diagrams for explaining a practical read operation shown in FIGS. 12A through 12C.

For example, assume that an area (area "02") of the state as shown in FIG. 11J is to be read out by the read-out instruction as shown in FIG. 16A. Note that the capacity of the RAM is, e.g., 8 bytes. In this case, the data string which is read out by this instruction data is a data string as shown in FIG. 16B, and the number of bytes data indicates 1 byte. Therefore, the counter is "5" when it is stored in the RAM. Since the count is other than "0", this data string is appended to the response data indicating acceptance of continuous read-out, and is output (FIG. 16C). When continuous read-out instruction data as shown in FIG. 16D is input, a data string as shown in FIG. 16E is set in the RAM. In this case, since the count is "0", this data string is appended to the response data indicating read-out completion, and is output (FIG. 16F).

The erasure operation for data memory 16 will be described with reference to the flow chart of FIG. 17. When the data stored in memory 16 is to be erased, erase instruction data having a format as shown in FIG. 18 is input. The erase instruction data consists of erase function code field 200 and area number field 202. In step 204, when it is determined that an erase instruction is input, CPU 15 finds an area number appended to the instruction data from area "00" of data memory 16, in step 206. If the corresponding area number is not found in step 206 (NO in step 206), CPU 15 outputs response data indicating that the corresponding area is not found, in step 208, and the flow returns to step 204 to wait for the next instruction. If YES in step 206, CPU 15 refers to the start address of that area to confirm the pointer data of this area. More specifically, CPU 15 checks in step 210 whether all the bits of the pointer data are "1". If YES in step 210, CPU 15 outputs response data indicating an unwritten area in step 212, and the flow returns to step 204.

However, if NO in step 210, and if not all the bits of the pointer data are "1" (step 214), CPU 15 outputs response data indicating completion of erasure in step 216, and the flow returns to step 204. In this case, CPU 15 sets all the bits of this pointer data to "1" (i.e., writes $FF_H$), outputs response data indicating completion of erasure, and the flow returns to the instruction data wait mode of seep 204.

In the above embodiment, as shown in FIG. 3, CPU 15, data memory 16 and program memory 17 are integrated into a single chip. However, they can be formed in different chips. The hardware arrangement of the portable electronic device can be modified within the spirit and scope of the present invention.

Furthermore, in the above embodiments, an IC card has been exemplified as a portable electronic device. The shape of the portable electronic device is not limited to a card-like shape, but can be a block-like shape or a pencil-like shape.

What is claimed is:

1. A portable electronic apparatus comprising:
   a contactor section connectable with a portable electronic apparatus handling system for transmitting a command for externally accessing said portable electronic apparatus;
   storage means for storing a data string supplied from said portable electronic apparatus handling system;
   reading means for reading out a data string from said storage means in response to a read instruction supplied from said portable electronic apparatus handling system;
   appending means for appending information indicating whether the data string is valid or not to a start of the readout data string; and
   outputting means for outputting the data string with said information appended thereto.

2. An apparatus according to claim 1, wherein the data string read out by the read instruction from said portable electronic apparatus handling system consists of a plurality of blocks, and a data length of the data string is such that the data string cannot be output from said portable electronic apparatus to said portable electronic apparatus handling system in a single transmission.

3. An apparatus according to claim 2, wherein said portable electronic apparatus handling system stops subsequent data string readout when the information indicating whether the data string is valid or not indicates that the data string is invalid.

4. An apparatus according to claim 1, wherein the information indicating whether the data string is valid or not is indicated by setting a most significant bit of information indicating a data length of the data string to one or another value.

5. An apparatus according to claim 1, wherein said storage means comprises an electronically erasable programmable read only memory.

6. A potable electronic apparatus comprising:
   a contactor section connectable with a portable electronic apparatus handling system for transmitting a command for externally accessing said portable electronic apparatus;
   storage means for storing a data string supplied from said portable electronic apparatus handling system;
   appending means for appending, in response to a write instruction from said portable electronic apparatus handling system, information indicating invalidity of the data string to the data string supplied from said portable electronic apparatus handling system;
   writing means for writing the data string with the invalidity information appended thereto into said storage means; and
   updating means for updating the information indicating invalidity to information indicating validity after completion of data string writing by said writing means.

7. An apparatus according to claim 6, wherein the information indicating validity or invalidity of the data string indicates it by setting a most significant bit of information indicating a data length of the data string to one or another value.

8. An apparatus according to claim 6, wherein said storage means comprises an electrically erasable read only memory.

9. A portable electronic apparatus comprising:
   a contactor section connectable with a portable electronic apparatus handling system for transmitting a command for externally accessing said portable electronic apparatus;
   storage means for storing a data string supplied from said portable electronic apparatus handling system; and
   control means for reading out a data string from said storage means, appending information indicating whether the data string is valid or not to a start of the readout data string, outputting the data string in response to a read instruction supplied from said portable electronic apparatus handling system, appending information indicating invalidity of the data string to a data string supplied from said portable electronic apparatus handling system and writing the data string in said storage means in response to a write instruction from said portable electronic apparatus handling system, thereby updating the information indicating invalidity to information indicating validity after completion of data string writing.

* * * * *